(12) United States Patent
Shimada et al.

(10) Patent No.: US 8,174,938 B2
(45) Date of Patent: May 8, 2012

(54) OPTICAL DISC APPARATUS AND METHOD OF CONTROLLING THE SAME

(75) Inventors: Yoshiaki Shimada, Yokohama (JP); Masakatsu Kinoshita, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 757 days.

(21) Appl. No.: 11/527,499

(22) Filed: Sep. 27, 2006

(65) Prior Publication Data
US 2007/0076088 A1 Apr. 5, 2007

(30) Foreign Application Priority Data
Sep. 30, 2005 (JP) ................................. 2005-288696

(51) Int. Cl.
*G11B 7/00* (2006.01)
*B41J 2/435* (2006.01)
*G01D 15/14* (2006.01)

(52) U.S. Cl. ..................................... 369/44.11; 347/224

(58) Field of Classification Search .................. None
See application file for complete search history.

(56) References Cited

U.S. PATENT DOCUMENTS
5,126,905 A * 6/1992 Nomura et al. ............ 360/266.5
2003/0231561 A1 12/2003 Morishima
2004/0141045 A1 7/2004 Hanks
2006/0280078 A1 * 12/2006 Hanks et al. .............. 369/47.39

FOREIGN PATENT DOCUMENTS
| EP | 1 450 366 A2 | 8/2004 |
| JP | 9-306144 | 11/1997 |
| JP | 2002-203321 | 7/2002 |
| WO | WO 2004/109677 A1 | 12/2004 |
| WO | WO 2005/112028 A1 | 11/2005 |

* cited by examiner

*Primary Examiner* — Mohammad Ghayour
*Assistant Examiner* — Carl Adams
(74) *Attorney, Agent, or Firm* — Oblon, Spivak, McClelland, Maier & Neustadt, L.L.P.

(57) ABSTRACT

An optical disc device includes a position detector which detects a position of the pickup in accordance with a output signal from the first light receiver of a position sensor which receives light from a encoder board, a rotation position detector which detects a rotation position of the disc in accordance a output signal from the second light receiver which receives a reflected light or a transmitted light of the light irradiated onto the variable area of the disc, and a controller which controls a recording dot marks on a label surface of the disc by driving a feed motor to move the pickup based on the rotation position detected by the rotation position detector and the position detected by the position detector and driving the pickup to control a intensity of the laser light in accordance with the rotation position detected by the rotation position detector.

2 Claims, 14 Drawing Sheets

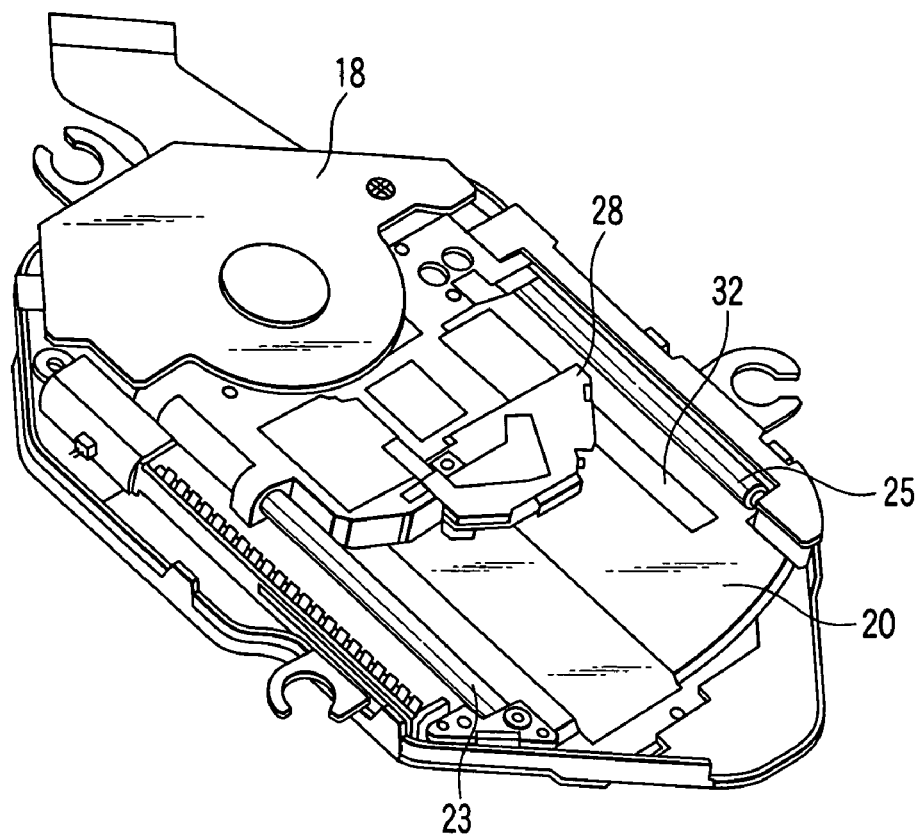
F I G. 7
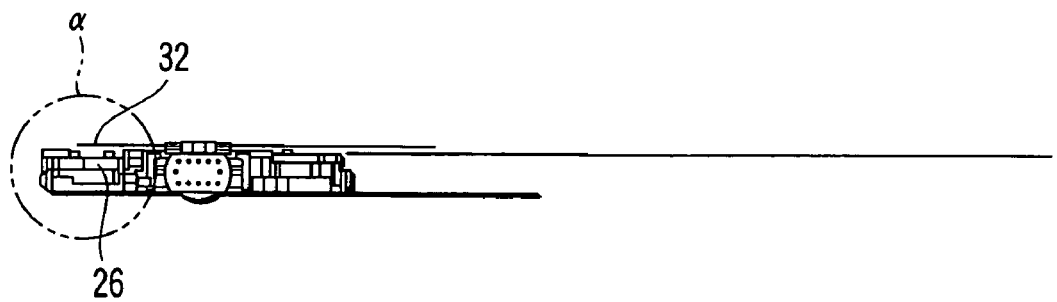
F I G. 8

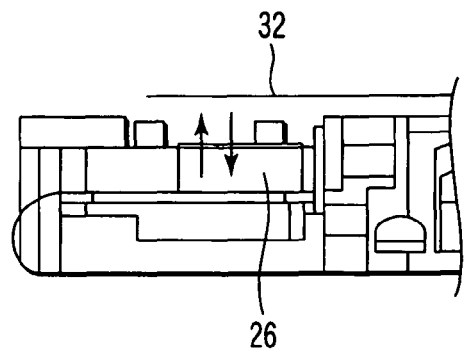
F I G. 9
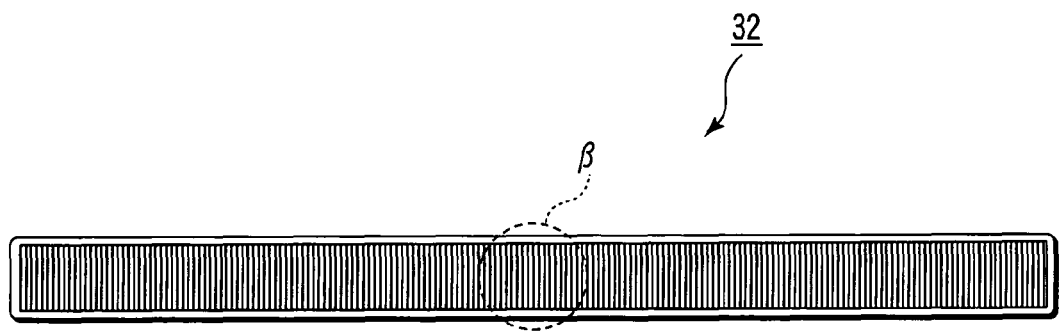
F I G. 10
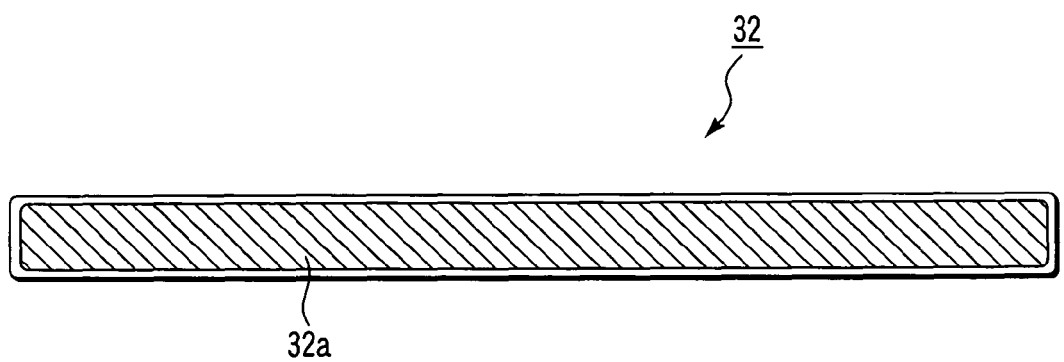
F I G. 11

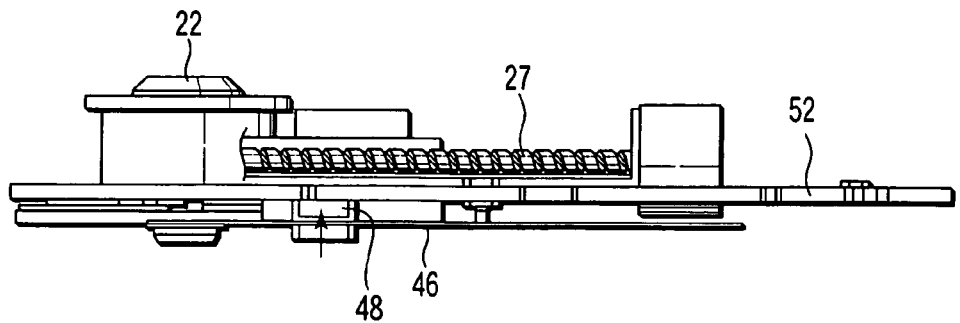
F I G. 17
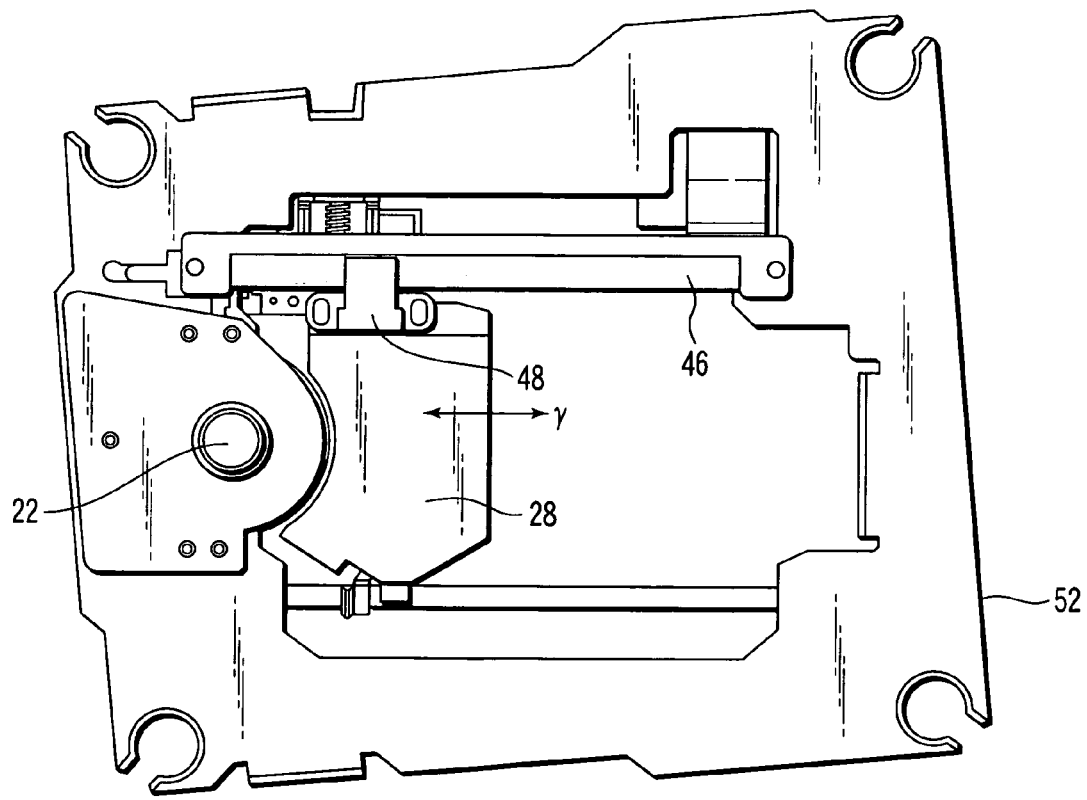
F I G. 18

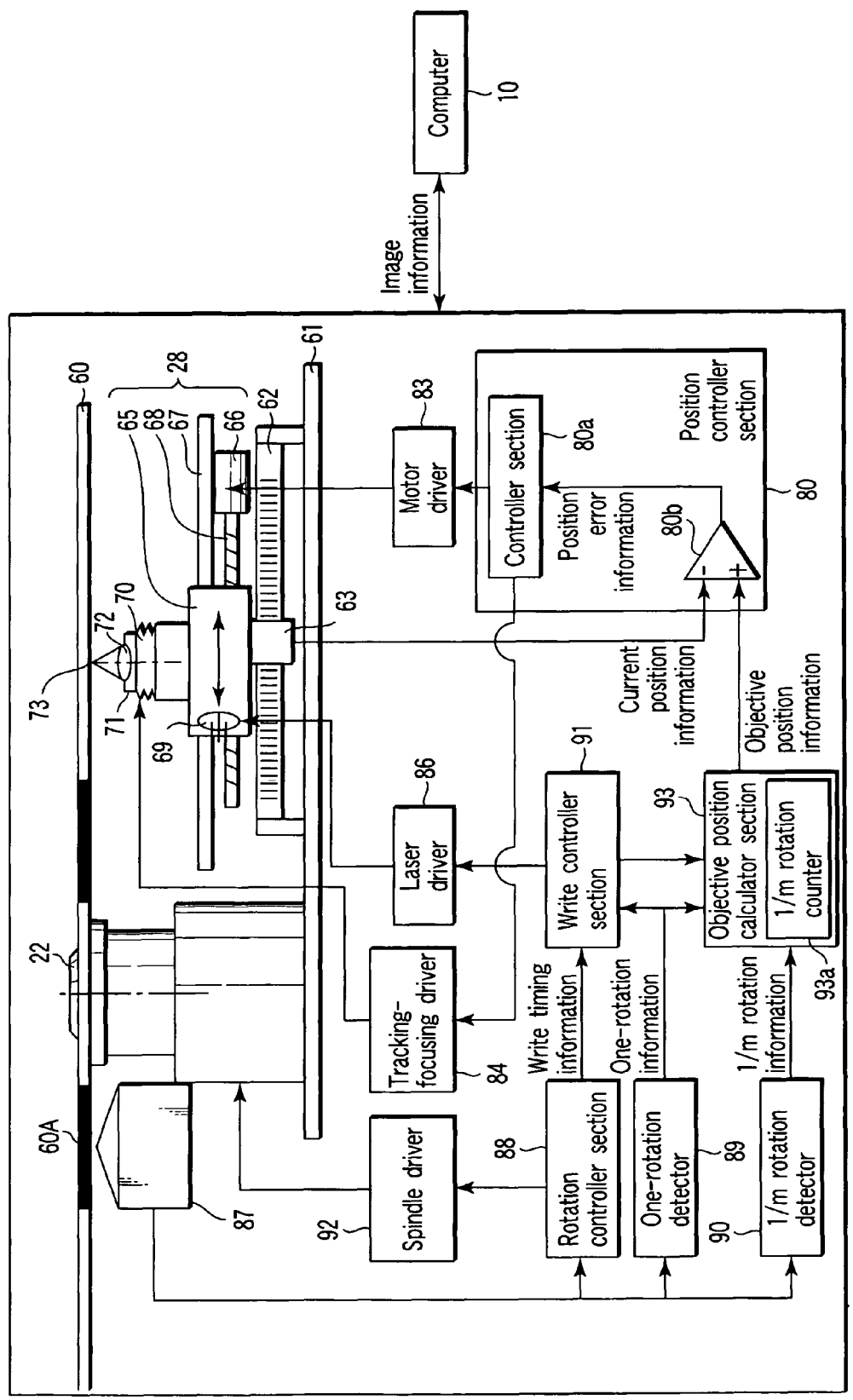
F I G. 21

OPTICAL DISC APPARATUS AND METHOD OF CONTROLLING THE SAME

CROSS-REFERENCE TO RELATED APPLICATIONS

This application is based upon and claims the benefit of priority from prior Japanese Patent Application No.2005-288696, filed Sep. 30, 2005, the entire contents of which are incorporated herein by reference.

BACKGROUND OF THE INVENTION

1. Field of the Invention

The present invention relates to an optical disc apparatus capable of applying an image on a label surface of an optical disc and to a method of controlling the optical disc apparatus.

2. Description of the Related Art

Jpn. Pat. Appln. KOKAI Publication No. 2002-203321 will now be referred to as an example that discloses a prior art for forming an image on a label surface of an optical disc by using a pickup laser of an optical disc apparatus. According to the disclosed technology, when performing image recording on a label surface of an optical disc without track information, the image is formed while performing one-rotation tracing in a concentric state from a reference position in the circumferential direction. In operation, when having returned to the reference position in the circumferential direction, a pickup body is moved by a predetermined pitch Δr in the outer peripheral direction, and concentric image rendition is performed again onto the next track. The operation is repeated to perform image rendition onto the label surface (see Jpn. Pat. Appln. KOKAI Publication No. 2002-203321, FIG. 10, and Paragraph [0016]).

According to the technology described above, dots are formed by concentric tracing of the pickup laser, track-to-track movement is all time involved (i.e., track-to-track movement cannot be performed during image rendition; or image rendition cannot be performed during track-to-track movement), so that the movement time results in wasted time. Accordingly, the waste time accumulates corresponding to the number of track-to-track movements during image rendition of the total disc circular area.

For the label image rendition, high speed image rendition is demanded, and therefore, the problem of wasted time should be solved.

BRIEF SUMMARY OF THE INVENTION

According to one aspect of the present invention, there is provided an optical disc apparatus comprising: a spindle motor which rotates an optical disc; a optical pickup which irradiates the laser light onto the optical disc; a feed motor which moves the optical pickup in the radial direction; an encoder board including transmittance or reflectance cyclically varying along a direction parallel to a movement direction of the optical pickup; a first emission section which moves following the movement of the optical pickup and which concurrently irradiates light onto the encoder board; a pickup position sensor including a first light receiver section which receives reflected light or transmitted light of the light irradiated onto the encoder board; a pickup position detection section which detects a position of the optical pickup in accordance with a output signal from the first light receiver section of the pickup position sensor; a second light emission section which irradiates light onto variable area of the optical disc, the variable area including reflectance or transmittance cyclically varying; a rotation encoder including a second light receiver section which receives a reflected light or a transmitted light of the light irradiated onto the variable area; a rotation position detection section which detects a rotation position of the optical disc in accordance a output signal from the second light receiver section; and a control section which controls a recording dot marks on a label surface of the optical disc by driving the feed motor to move the pickup in the radial direction based on the rotation position detected by the rotation position detection section and the position detected by the pickup position detection section and driving the optical pickup to control a intensity of the laser light in accordance with the rotation position detected by the rotation position detection section.

BRIEF DESCRIPTION OF THE SEVERAL VIEWS OF THE DRAWING

FIG. 7 is a perspective view showing a reverse side of the mechanical unit of the optical disc apparatus according to the present embodiment;

FIG. 8 is a cross sectional view showing a part of the mechanical unit of the optical disc apparatus according to the present embodiment;

FIG. 9 is an enlarged cross sectional view showing a portion α of the mechanical unit;

FIG. 10 is a schematic view showing an encoder board to be provided in the optical disc apparatus according to the present embodiment;

FIG. 11 is a schematic view showing a reverse side of the encoder board;

FIG. 17 is a schematic view as viewed from a sidewall in the case where a transmissive encoder board and a transmissive position sensor are applied to a half-height optical disc drive unit;

FIG. 18 is a schematic plan view showing a reverse side of the half-height optical disc drive unit;

FIG. 21 is a schematic view showing peripheral portions of a pickup section of an optical disc apparatus according to one embodiment of the invention;

DETAILED DESCRIPTION OF THE INVENTION

Embodiments of the present invention will be described below with reference to the drawings.

Figure 1:
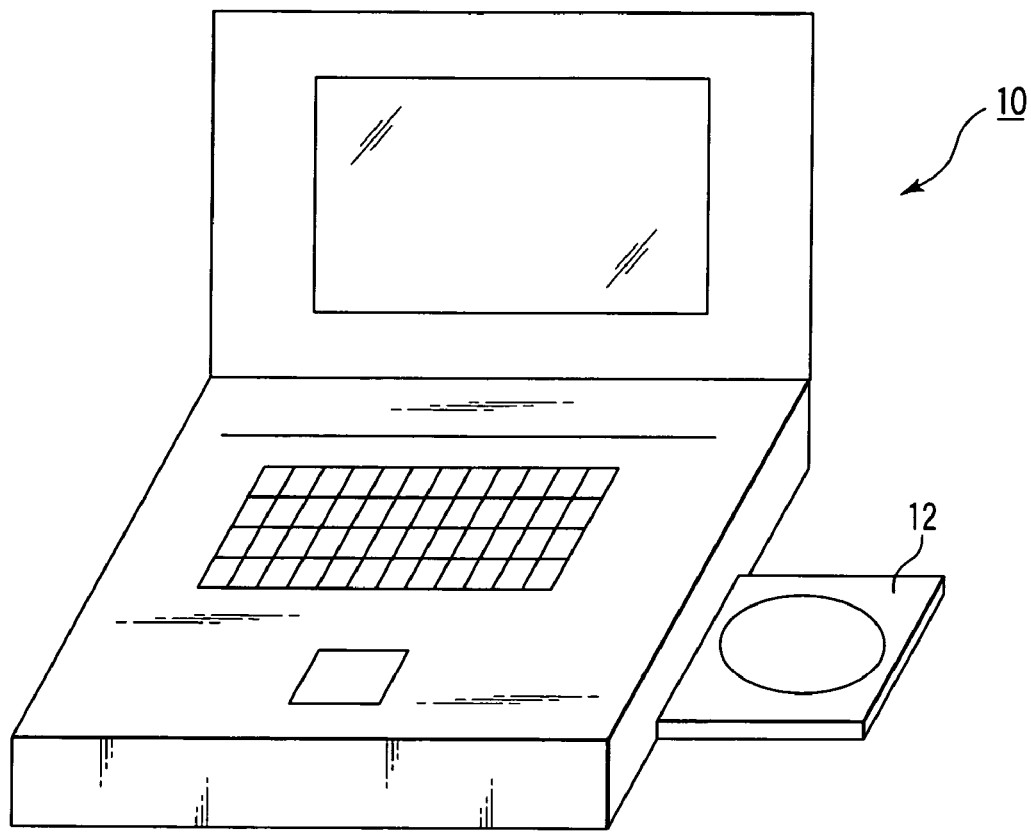
FIG. 1 is a schematic view showing a personal computer serving as an information processor according to an embodiment of the present invention.

FIG. 1 is a schematic view showing a notebook personal computer serving as an information processor according to one embodiment of the present invention. A computer 10 has an optical disc apparatus 12 such as a DVD drive (FIG. 1 shows the state of the optical disc apparatus of which a tray is extended). The computer 10 has, for example, a semiconductor memory and/or hard disc drive serving as storage unit and a central processing unit (CPU) serving as instructing means. The storage unit stores predetermined information for being stored on then optical disc, and the instructing means instructs the optical disc apparatus 12 to supply information from the storage unit and to record the information on the optical disc. Especially, the information processor is capable of processing a certain type of image information to be recorded (to be rendered on a label surface, for example) on an optical disc surface or area not containing track information.

Figure 2:
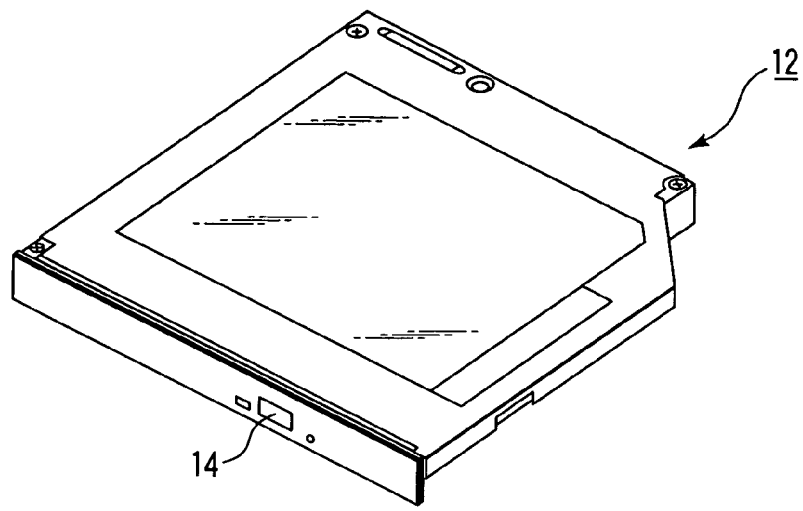
FIG. 2 is a perspective view showing an optical disc apparatus of the personal computer according to the present embodiment.
Figure 3:
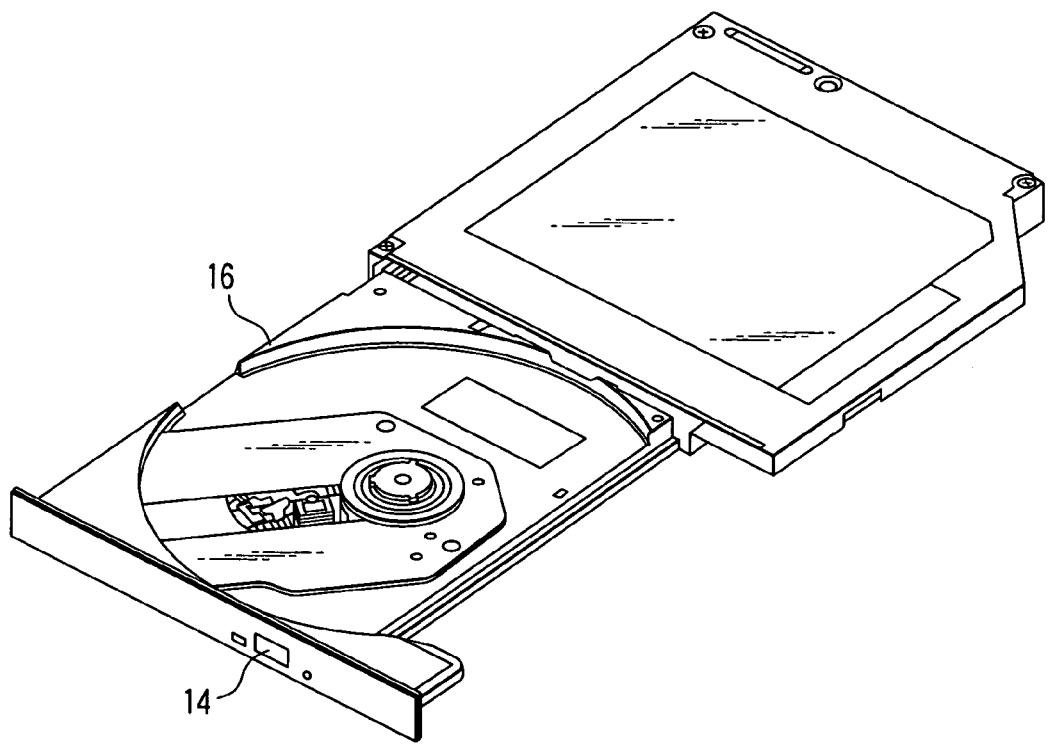
FIG. 3 is a perspective view showing the state of a drawer portion extended from the optical disc apparatus.

With reference to FIG. 2, the optical disc apparatus 12 has an inject button 14. Upon operation such as depression of the inject button 14, a drawer portion 16 is extended, as shown in FIG. 3.

Figure 4:
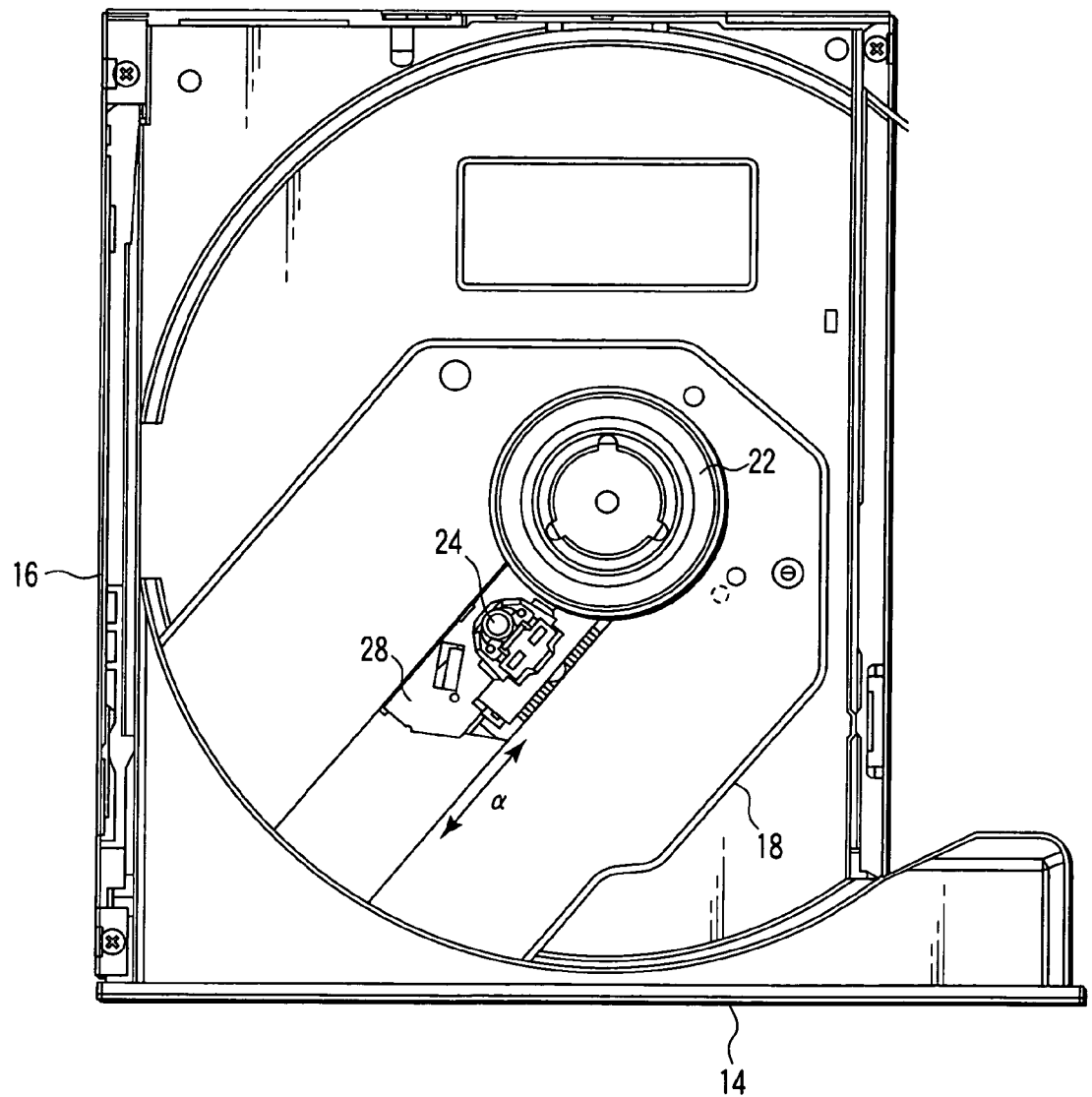
FIG. 4 is a plan view showing the drawer portion of the optical disc apparatus according to the present embodiment.

As shown in FIG. 4, the drawer portion 16 is configured of a driver circuit board portion of the drive and a mechanical unit 18. A pickup section 28 (PUH) of the mechanical unit 18 is driven to take a movement path in a direction α, which is a radial direction, about a disc rotating motor (spindle motor) 22.

Figure 5:
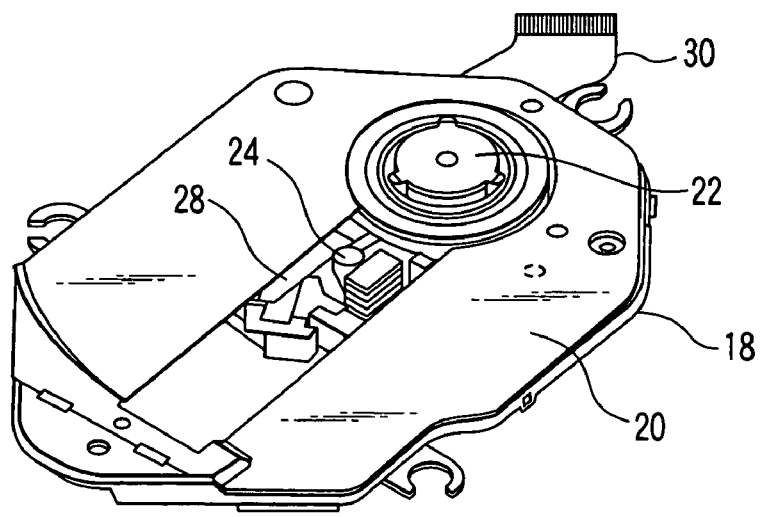
FIG. 5 is a plan view showing a mechanical unit of the optical disc apparatus according to the present embodiment.

With reference to FIG. 5, the mechanical unit 18 includes, among other things, the spindle motor 22, the pickup section 28, mechanisms for driving the spindle motor 22 and the pickup section 28, and a cover member 20 for covering the mechanical sections. The pickup section 28 has an objective lens 24 for irradiate laser beam to the optical disc. The mechanical unit 18 is connected to a predetermined circuit board of the optical disc apparatus 12 through a flexible cable 30 (FPC).

Figure 6:
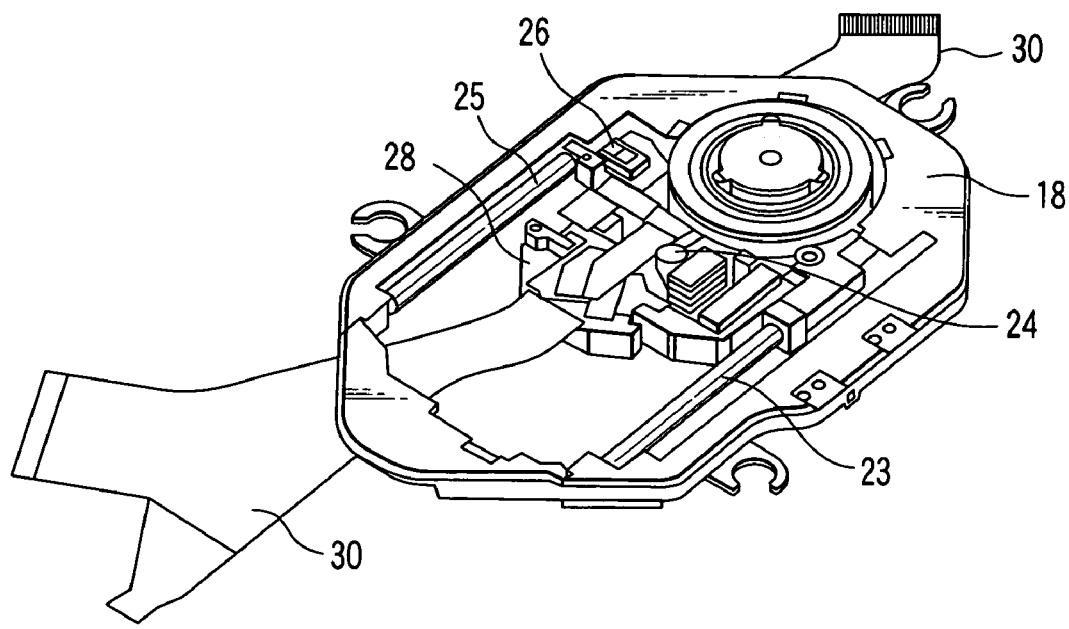
FIG. 6 is a perspective view showing the state of the mechanical unit of which a cover is removed.

FIG. 6 is a perspective view showing the mechanical unit 18 from which the cover member 20 is removed. As a pickup drive mechanism, the mechanical unit 18 includes a primary shaft 23 and a secondary shaft 25. The primary shaft 23 applies drive forces from a pickup feed motor to the pickup section 28 through a lead screw and a rack gear meshed therewith, and is mounted with the rack gear that transfers drive forces. The secondary shaft 25 is provided opposite the primary shaft 23 and supports the pickup section 28, and is not involved to the transfer of the drive forces. Further, the mechanical unit 18 includes a position sensor 26 having a first emission section and a first light receiver section, and an encoder board that, while not shown in FIG. 6, reflects and returns light irradiated from the position sensor 26 to the light receiver section. Thus, the provision of the position sensor 26 on the side of the secondary shaft 25 enables disposition of the position sensor 26 and the encoder board 32 in a slim drive (optical disc apparatus for a notebook personal computer), which is restricted in many respects, such as external dimensions and mechanisms. In this case, the disposition is possible without influencing, for example, the shape of the pickup drive mechanism and the arrangement of components and without increasing external dimensions of the optical disc apparatus.

FIG. 7 is a perspective view of the mechanical unit 18 as viewed from the reverse side thereof.

The encoder board 32 is bonded with an adhesive material, such as a bond or adhesive, to the reverse side of the cover member 20 along the movement path of the pickup section 28 to face the emission section and light receiver section of the position sensor 26. The encoder board 32 may be directly rendered on the reverse side of the cover member 20 by using means, such as etching. Thus, the encoder board 32 is mounted to the cover member 20 provided so as not to shield laser light incoming from the pickup section 28. Thereby, adverse effects on recording and playback operations can be prevented without interference of output light of the position sensor 26 on the laser light in the pickup section 28.

In addition, the encoder board 32 is continually formed to cover a range from a further inner periphery side than a position where the light of the position sensor 26 reflects in the event that the pickup section 28 is positioned on an innermost periphery side to a further outer periphery side than a position where the light of the position sensor 26 reflects in the event that the pickup section 28 is positioned on an outer periphery side. Thereby, a position detection signal can become output without discontinuation even when the pickup section 28 continually moves across a total movable range.

FIG. 8 is a cross sectional view of the mechanical unit 18. FIG. 9 is an enlarged view of the cross sectional view, which shows a front end portion α of the mechanical unit 18 where the position sensor 26 and the encoder board 32 are positioned. More specifically, the position sensor 26 and the encoder board 32 are disposed to oppose one another, in which laser light irradiated from the emission section of the position sensor 26 is reflected on the encoder board 32, and is returned to the light receiver section of the position sensor 26.

Figure 12:
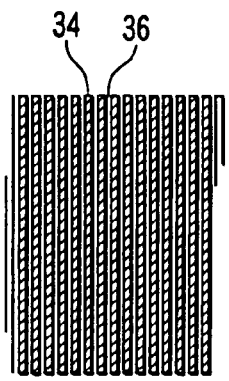
FIG. 12 is an enlarged plan view of a portion β of the encoder board.

For example, bar-shaped marks as shown in FIG. 10, for example, are cyclically formed on the encoder board 32. With the marks, for example, reflection, transmission, and absorption are performed with respect to the light output from the position sensor 26. By way of example, FIG. 12 shows an enlarged view of a portion β of the encoder board 32. In FIG. 12, the mark portion is configured of reflection portions 34 (zonal portions indicated by slanted lines) and non-reflection portions 36. It is sufficient if the respective non-reflection portion 36 is of a type that allows either light transmission or absorption. Alternatively, it is sufficient if the reflection portion 34 and the non-reflection portion 36 together allow light variations of two or more values. That is, in the area, the reflectance or transmittance cyclically varies along the mark array direction (radial direction about the spindle motor 22).

FIG. 11 is a schematic view showing a reverse side of the encoder board 32. The encoder board 32 is adhered to a reverse side of the cover member 20 by using an adhesive material 32a such as an adhesive or bond. The adhesive material 32a is preferably set in an area smaller than the area of the encoder board 32 to prevent overflow of an adhesive in the event of adhesion of the encoder board 32 to the cover member 20. Consequently, a case can be prevented in which an overflow of the adhesive material contacts the flexible cable thereby providing adverse effects on the movement of the pickup section 28.

Figure 13:
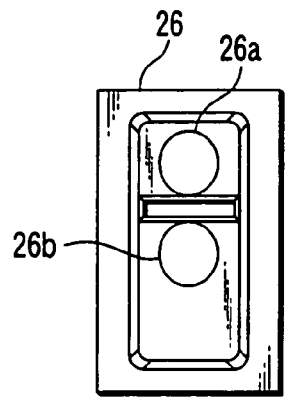
FIG. 13 is a schematic plan view showing a position sensor.
Figure 14:
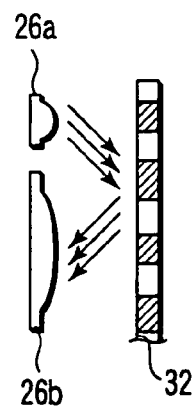
FIG. 14 is a schematic view showing the relationship between the position sensor and the encoder board.

Referring now to FIG. 13, the position sensor 26 includes an emission section 26a and a light receiver section 26b. As shown in FIG. 14, light irradiated from the emission section 26a of the position sensor 26 varies upon impingement on the encoder board 32. Part of varied light is reflected from the encoder board 32 and is received by the light receiver section 26b of the position sensor 26. The light receiver section 26b of the position sensor 26 may be larger than the emission section 26a.

Figure 15:
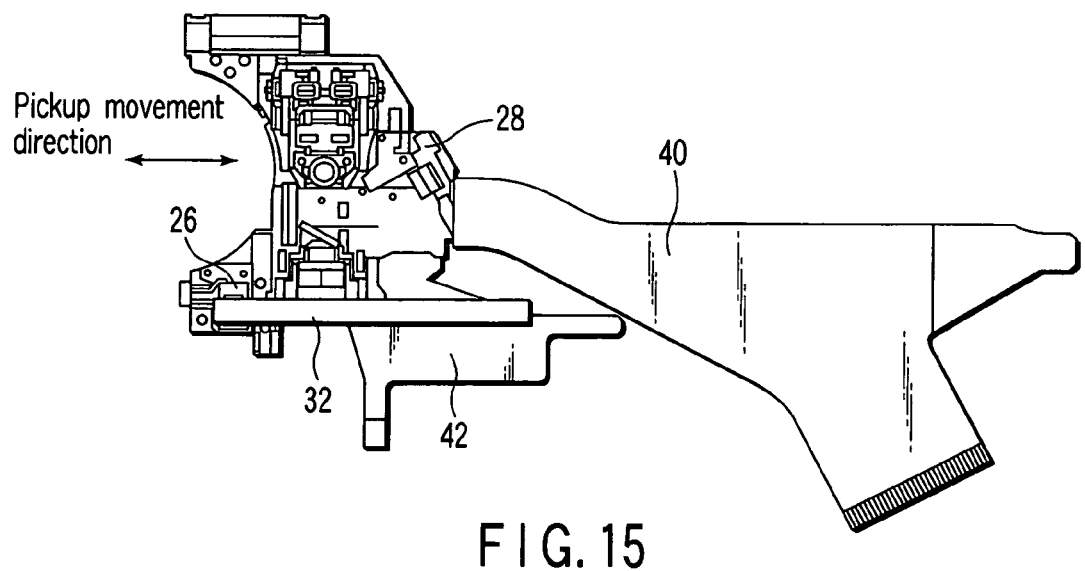
FIG. 15 is a schematic view showing an optical pickup section, the position sensor, and a configuration portion of a flexible cable connected to each of them.
Figure 16:
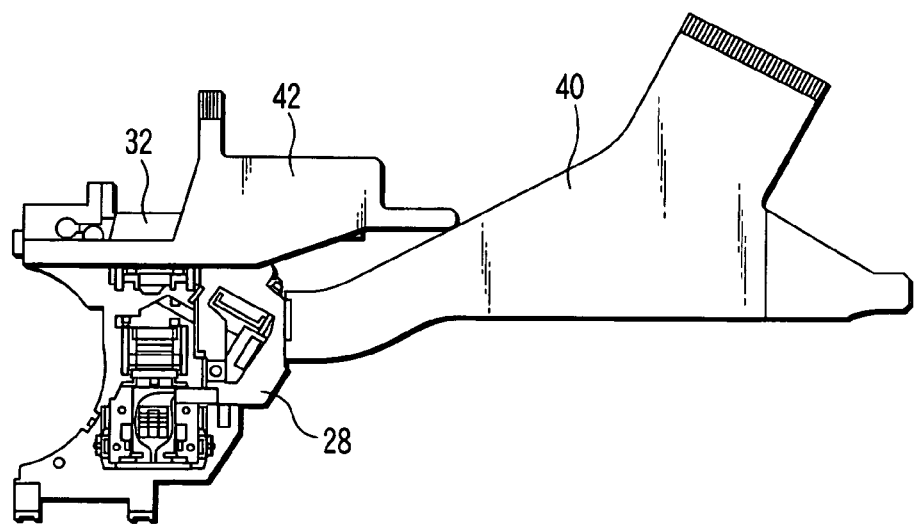
FIG. 16 is a schematic view showing the reverse side of the optical pickup section, the position sensor, and the configuration portion of the flexible cable connected to each of them.

Flexible cables 40 and 42 are connected to the pickup section 28 and the position sensor 26, respectively. FIG. 15 is a schematic view showing the configurations thereof. The pickup section 28 is connected to the flexible cable 40, and the flexible cable 40 is connected to the driver circuit board portion of the drive. In addition, the position sensor 26 is connected to the flexible cable 42, and the flexible cables 40 and 42 are disposed so as not to overlap with one another. In FIG. 15, the encoder board 32 is shown in such a manner as being overlapping the position sensor 26 and the flexible cable 42. However, it is actually bonded to the cover member 20 in that state. FIG. 16 is a schematic view of a reverse side of the configuration shown in FIG. 15. Thus, the flexible cables 40 and 42 are disposed so as not to overlap with one another.

The sensor means has thus been described with reference to the embodiment thereof that includes the reflection encoder board 32. That is, light irradiated from the position sensor 26 is varied by the encoder board 32, and reflected part of the irradiated light is received by the position sensor 26, whereby the position of the pickup section 28 is determined. However, the configuration may be such that two sensors, namely, an emission-dedicated position sensor and a reception-dedicated position sensor are respectively provided on two sides of a transmissive encoder board. An embodiment using a transmissive encoder board will be described immediately below.

FIG. 17 is a schematic view as viewed from the side in the case where a transmissive encoder board and a transmissive position sensor are applied to a half-height optical disc drive unit.

Unlike the embodiment using the encoder board 32, in the present embodiment is configured as follows. A transmissive position sensor 48 is disposed in such a manner as to clamp a transmissive encoder board 46 on the side where drive forces are exerted on the pickup section 28 provided in a half-height optical disc drive unit 52, that is, on the side of the primary shaft 23 that serves as the drive shaft. The transmissive position sensor 48 is formed of two independent sensors, namely, an emission-dedicated emission section and a transmission-dedicated light receiver section, in which light is irradiated from the emission section in the direction shown by the arrow in the figure, is led to transmit through the transmissive encoder board 46, and is then received by the light receiver section. Similarly as the reflection encoder board 32 shown in FIG. 12, the transmissive encoder board 46 is configured of two regions, namely, a transmissive region and a non-transmissive region. Upon impingement on the transmissive encoder board 46, the light is varied through the transmissive region and the non-transmissive region, and this variation is detected by the light receiver section. The non-transmissive region may be of a type that either absorbs the light or reflects the light in the amount not interfering light incoming from the emission section, but preferably is of a type that absorbs the light. The respective transmissive and non-transmissive regions are not each limited to the single type, but may be of more types to cause light variations of two or more values through the transmissive and non-transmissive regions. For example, two types of transmissive regions and two types of non-transmissive regions may be used to cause four types of light variations in total; that is, the regions may be set to four values in total (this applies as well to the reflection encoder board).

FIG. 18 is a schematic plan view showing the reverse side of the half-height optical disc drive unit 52. The pickup section 28 moves integrally with the transmissive position sensor 48 along a pickup movement direction γ with respect to the spindle motor 22 as a reference. The emission section side of the transmissive position sensor 48 is shown in the figure. The transmissive encoder board 46 is positioned in a lower portion of the emission section, and in a further lower portion, there is positioned the light receiver section side (not shown) of the transmissive position sensor 48.

Figure 19:
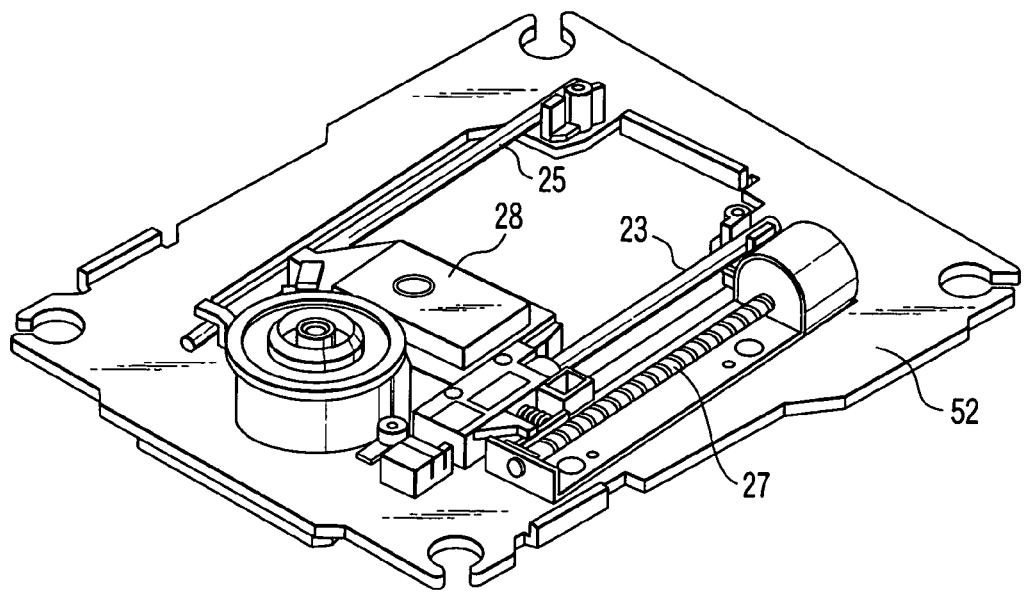
FIG. 19 is a perspective view showing the half-height optical disc drive unit.

FIG. 19 is a perspective view showing the half-height optical disc drive unit 52. FIG. 19 shows the pickup section 28, primary shaft 23, secondary shaft 25, and lead screw 27. However, the figure does not show the transmissive position sensor 48 and the transmissive encoder board 46 because they are positioned in the reverse side of the primary shaft 23.

Figure 20:
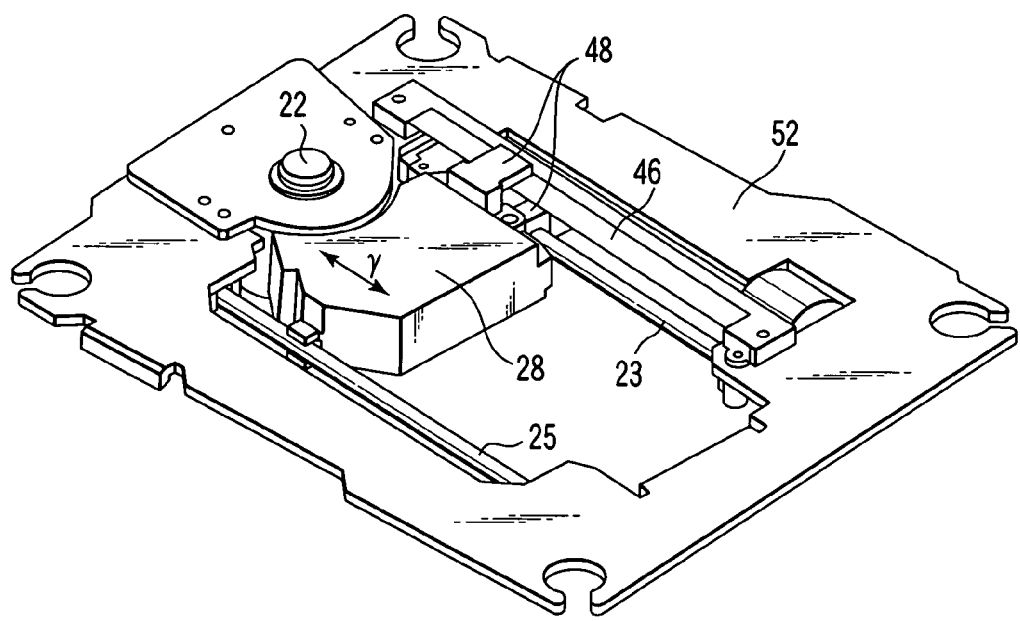
FIG. 20 is a perspective view showing the reverse side of the half-height optical disc drive unit.

FIG. 20 is a perspective view showing the reverse side of the half-height optical disc drive unit 52. The pickup section 28 moves integrally with the transmissive position sensor 48 along a pickup movement direction γ with respect to the spindle motor 22 as the reference. The emission section side of the transmissive position sensor 48 is shown in the upper portion. The transmissive encoder board 46 is positioned in the lower portion of the emission section, and in the further lower portion, there is positioned the light receiver section side of the transmissive position sensor 48.

Thus, in the above-described embodiment, as the sensor means for detecting the movement and/or position of the pickup, the position sensor 26, 48 and the encoder board 32, 46 are used and are organically disposed (specifically, the position sensor 26, 48 is provided integrally with the pickup, and the encoder board 32, 46 is provided along the movement path of the pickup). Accordingly, unlike the approach of detecting the pickup movement in accordance with the rotation of a feed motor, the movement and position of the pickup section 28 can be directly detected. Consequently, the detection accuracy is improved.

The configuration of the pickup section 28 of the optical disc apparatus will now be described herein below. What will be described herein below is a configuration for performing information recording and/or playback by using the optical disc apparatus onto a portion or area of an optical disc. The portion or area of the optical disc is a portion other than a normal recording and/or playback area of an optical disc, such as a label surface having no track information or an area existing outside of a data recording area of the information surface of the optical disc.

FIG. 21 is a schematic view showing peripheral portions of a pickup section 28 of an optical disc apparatus according to one embodiment of the present invention.

An optical disc 60 is placed on the spindle motor 22 that is mounted to a chassis 61 of the optical disc apparatus, and information writing and playback are performed by the pickup section 28. The pickup section 28 is movable in the left and right directions (as viewed in the drawing) in conjunction with drive forces of a feed motor 66 when the drive forces are received through a lead screw 68 by a pickup body 65 supported by a guide shaft 67. A laser diode 69 is built in the pickup body 65. Laser light irradiated from the laser diode 69 is irradiated onto a laser spot 73 of the optical disc 60 through an objective lens 72, whereby operation such as information writing or playback is performed. Tracking and focusing of the objective lens 72 are performed in the manner that the objective lens 72 is actuated by a lens actuator 70. The lens actuator 70 is configured of driving components 71, such as a wire suspension, a magnetic circuit, and a driving coil. Therefore, different from the feed motor 66, no backlash occurs, and friction also is less, thereby to enable fine position control.

The position of the pickup body 65 is determined in the manner that light is brought into impingement on an encoder board 62, and a variation in the light reflection or transmission is detected by a position sensor 63. A position signal representing the position of the pickup body 65, which signal has been detected by the position sensor 63, is supplied to an arithmetic device 80b of a position controller section 80.

Figure 22A:
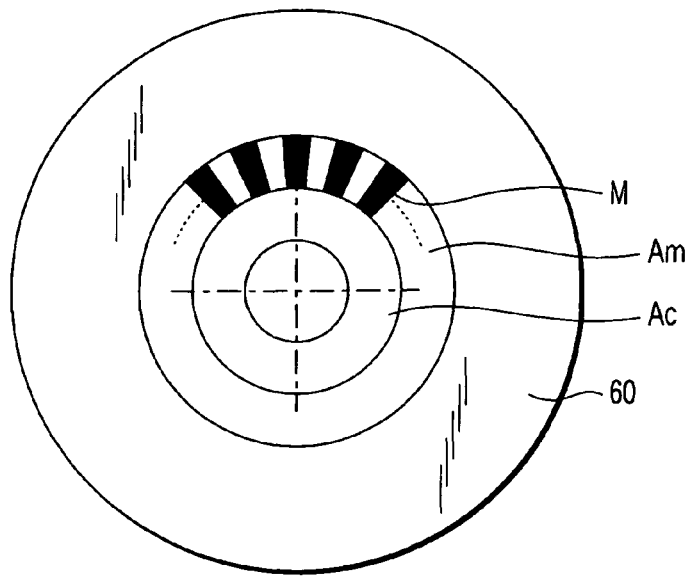
FIG. 22A is a plan view showing a label surface of an optical disc according to one embodiment of the invention.
Figure 22B:
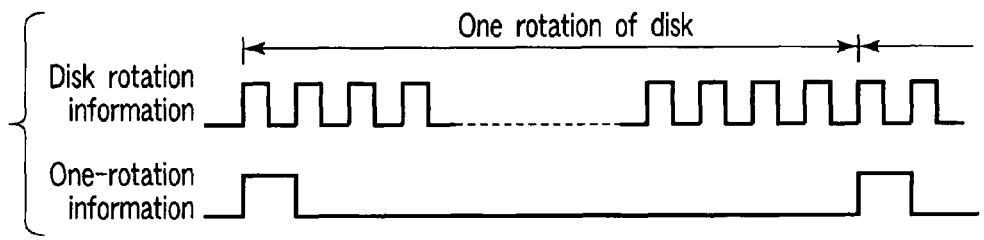
FIG. 22B is a view showing oscillation timing of disc rotation information and one-rotation information.

Light is irradiated onto the label surface of the optical disc 60 from a rotation encoder 87 that includes a second emission section and a second light receiver section, and an intensity variation in reflected light of the light is detected by the rotation encoder 87. Thereby, the rotation position of the optical disc is determined. With reference to FIG. 22A, n (number of) bar-shaped marks M (n=integer) are cyclically arranged in an area Am of an internal peripheral area, excluding a clamping area Ac, of the optical disc. The mark M is different from the adjacent area in reflectance or transmittance. That is, in the area Am, the reflectance or transmittance cyclically varies along the concentric circle. The rotation encoder 87 radiates light onto the area Am, which is provided with the marks M, of the rotating optical disc 60, and detects reflected light or transmitted light. Because the mark M is different from the adjacent area, the rotation encoder 87 is able to detect the mark M. With reference to FIG. 22B, each time the mark M is detected, the rotation encoder 87 supplies one pulse as rotation position information of the optical disc 60 to a rotation controller section 88, a one-rotation detector 89, and a 1/m rotation detector 90. Since the n marks M are provided on the optical disc 60, n (number of) pulse signals are generated upon one rotation of the optical disc 60.

In accordance with the rotation position information provided from the rotation encoder 87, the rotation controller section 88 controls the spindle motor 22 to perform constant linear velocity (CLV) to be constant in linear velocity through a spindle driver 92. Upon being supplied with the rotation position information from the rotation encoder 87, the rotation controller section 88 supplies write timing information to a write controller section 91.

The one-rotation detector 89 counts the pulse signal supplied from the rotation encoder 87. In units of n pulse signals thus counted, the one-rotation detector 89 recognizes the count to be one rotation of the optical disc 60, and supplies one-rotation information to the write controller section 91 and an objective position calculator section 93.

The 1/m rotation detector 90 counts the pulse signal supplied from the rotation encoder 87. Each time a predetermined number of pulse signals are counted, the 1/m rotation detector 90 recognizes the count to be a 1/m rotation of the optical disc 60, and supplies 1/m rotation information to the objective position calculator section 93.

A 1/m rotation counter 93a in the objective position calculator section 93 initiates count-up processing in the event that a count-up signal supplied from the write controller section 91 is enabled and one-rotation information is supplied from the one-rotation detector 89. Upon initiation of the count-up processing, the 1/m rotation counter 93a counts up each time 1/m rotation information is supplied.

In accordance with a count value of the 1/m rotation counter 93a, the objective position calculator section 93 calculates an objective position of the pickup section 28. Thus, in units of the count-up operation of the 1/m rotation counter 93a, objective position information increments in units of a 1/n track.

Tracking movement of the pickup section 28 will now be described here below.

The current position of the pickup section 28 is recognized by the position sensor 63, and current position information is supplied to the arithmetic device 80b of the position controller section 80. The arithmetic device 80b performs comparison between the current position information of the pickup section 28, which is supplied from the position sensor 63, and the objective position information, which is supplied from the objective position calculator section 93, thereby to generate position error information. The position error information is supplied from the arithmetic device 80b to a controller section 80a. The controller section 80a in turn supplies instructional voltages, respectively, to a tracking-focusing driver 84 and a motor driver 83 in correspondence to the position error information. The motor driver 83 and the tracking-focusing driver 84 is driven the feed motor 66 and a lens actuator 70, thereby to register the pickup section 28 and the laser spot 73 to the objective position. Even when a position error has occurred with the pickup section 28, the lens actuator 70 moves to cancel the error, so that the laser spot 73 can be accurately registered to the objective position.

Figure 23:
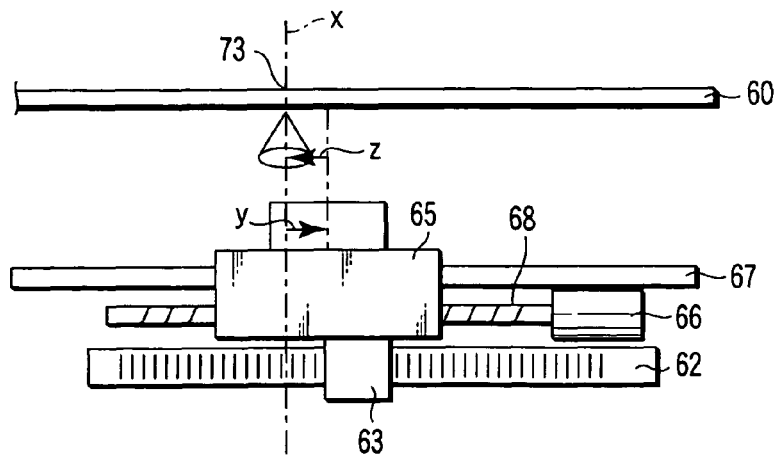
FIG. 23 is a schematic view showing control of a laser spot by a tracking-focus actuator.

The laser spot 73 is controlled by both or one of the feed motor 66 and the lens actuator 70 by necessity. For example, suppose that, as shown in FIG. 23, a positional difference y is present from the center of the pickup body 65 (substantially the center of a movable range in the radial direction of the objective lens) with respect to an objective position x of the laser spot 73. In this case, the laser spot 73 is driven by a movement amount z by means of the lens actuator 70 in the direction of canceling the positional difference y. For example, the gain of the position controller section 80 and the gain of the tracking-focusing driver 84 are predetermined such that the positional difference y and the movement amount z are equal to each other. In this case, the lens actuator 70 moves to cancel the error even when a position error has occurred with the pickup body 65. Consequently, the laser spot 73 can be accurately registered to the objective position x. While it is ideal to control to equalize the positional difference y and the objective position x to each other, a difference of, for example, up to 30% from a theoretical value causes no problems in practical application.

Figure 24:
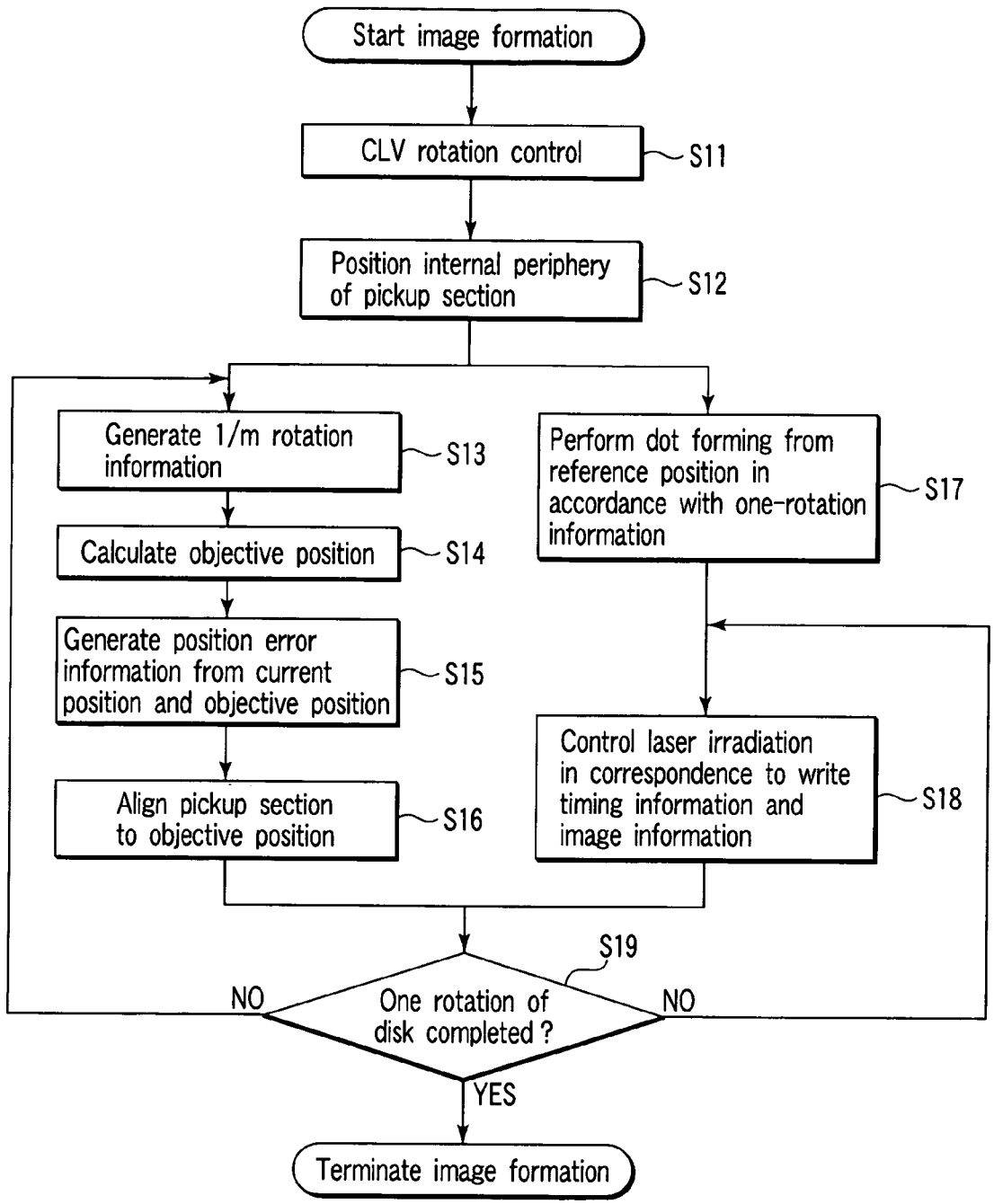
FIG. 24 is a flow chart showing a procedure of an image rendition method according to one embodiment of the invention.

Referring to a flowchart diagram of FIG. 24, an image rendition method will be described here below with reference to an example case of a one-tracking operation.

Upon reception of an initiation instruction for image rendition operation, the spindle motor 22, and the rotation controller section 88 performs CLV rotation control in accordance with rotation position information supplied from the rotation encoder 87 (step S11). The controller section 80a performs control such that the pickup section 28 is positioned by the motor driver 83 at a reference position in a predetermined radial direction of the internal periphery (step S12). From the reference position in the circumferential direction, the write controller section 91 starts dot mark forming (image rendition) onto the label surface of the optical disc 60 in accordance with one-rotation information supplied from the one-rotation detector 89 (step S17).

The write controller section 91 controls laser light irradiation from the laser diode 69 in accordance with write timing information generated by the rotation controller section 88 and image information supplied from the computer 10 (step S18). Upon reception of the input of the write timing information, the write controller section 91 refers to the image information supplied from the computer 10 and thereby determines whether to perform irradiation onto the label surface of the optical disc 60 or not. When having determined to perform the irradiation, the write controller section 91 determines a laser light power, and the write controller section 91 supplies an instructional voltage to a laser driver 86 in accordance with the determination result, thereby to control the irradiation of the laser light from the laser diode 69. Upon irradiation of the laser light from the laser diode 69 onto the label surface of the optical disc 60, dot marks corresponding to the laser light power are formed.

Synchronously with the progress of the irradiation control, a track-to-track movement sequence also is executed. In the 1/m rotation detector 90, 1/m rotation information, which has been obtained by dividing the one disc rotation by m, is generated (step S13). The generated 1/m rotation information is supplied to the objective position calculator section 93. The 1/m rotation counter 93a in the objective position calculator section 93 counts up each time 1/m rotation information is supplied. Then, the objective position calculator section 93 generates a previous objective position of the pickup section 28 corresponding to the count value of the objective position calculator section 93 (step S14). The objective position varies in units of the 1/m track each time the objective position calculator section 93 counts up.

A calculated objective position is supplied as objective position information to the arithmetic device 80b. The arithmetic device 80b performs comparison between current position information, which has been supplied from the position sensor 63, and the objective position information, thereby generating position error information (step S15). The generated position error information is supplied to the controller section 80a. In accordance with the position error information, the controller section 80a supplies an instructional voltage to the motor driver 83 and the tracking-focusing driver 84. In accordance with the instructional voltage, the motor driver 83 and the tracking-focusing driver 84 drive the feed motor 66 and the lens actuator 70, whereby the pickup section 28 and the laser spot 73 are registered to the objective position (step S16).

Then, the write controller section 91 determines whether or not one rotation is completed (step S19). If one rotation is not yet completed ("No " in step S19), the track-to-track movement control in steps S13 to S16 and the laser light control in step S18 are performed. If one rotation is completed ("Yes " in step S19), the image rendition operation terminates.

In accordance with feedback position control as described above, the pickup section 28 and the laser spot 73 all time move in the follow-up manner to the objective position even during the track-to-track movement. Consequently, dot marks can be formed even during the movement.

Figure 25:
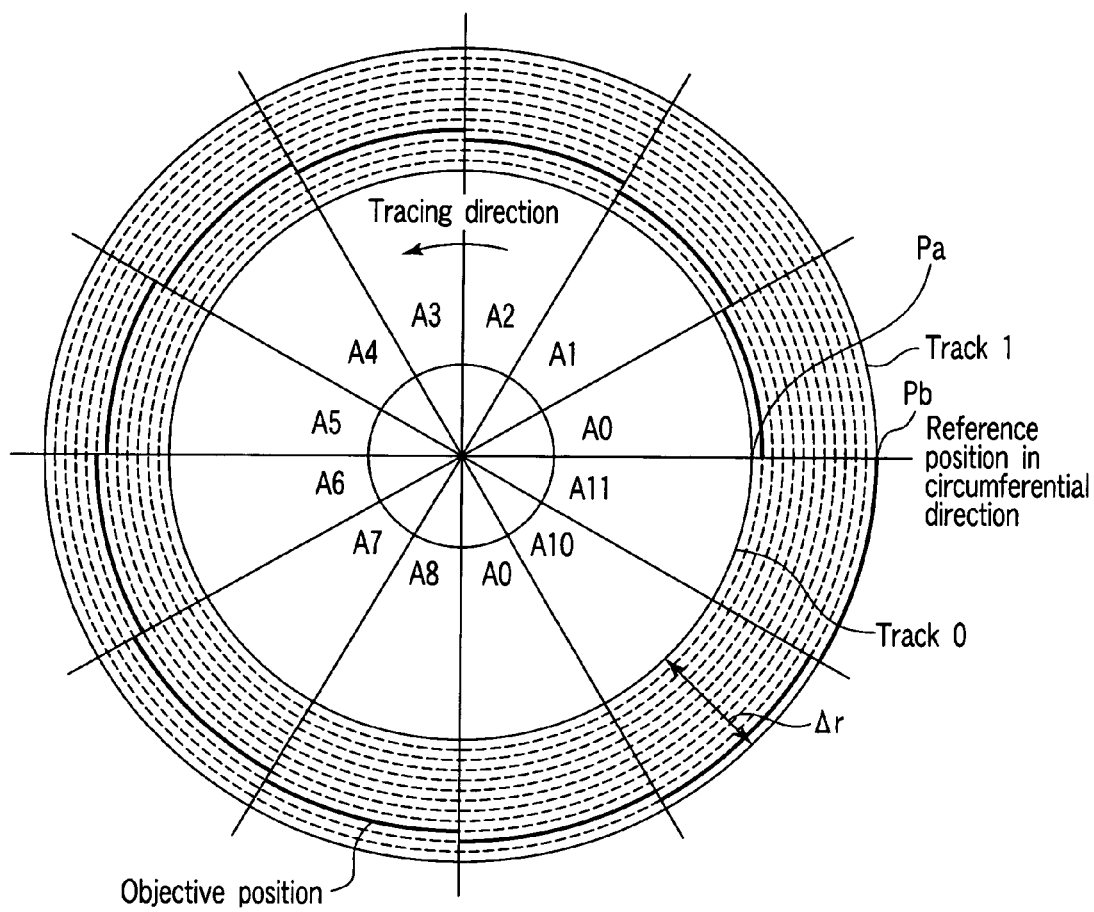
FIG. 25 is a view descriptive of an image rendition operation according to one embodiment example of the invention.

FIG. 25 is a view descriptive of the operation described above. The following will describe an image rendition operation in one rotation of the disc. Image rendition is started from a reference position Pa in the circumferential direction of a track 0. With the pickup laser, dot marks are progressively formed as performing tracing operation from the position Pa in the counterclockwise direction. Synchronously, a respective objective position (shown by a thick line) for the pickup is set in units of a predetermined rotation angle of the disc. In the shown example, one rotation of the disc is divided by 12, and the objective track is changed by the $\frac{1}{12}$ track in units of the $\frac{1}{12}$ rotation. More specifically, it is changed as: 0 track in an area A0, $\frac{1}{12}$ track in an area A1, $\frac{2}{12}$ track in an area A2, $\frac{3}{12}$ track in an area A3, . . . ; and it is set as: $\frac{11}{12}$ track in an area A11, and $\frac{12}{12}$ (i.e., track 1) in area A0 again. In this manner, the track objective position for one rotation of the disc is changed. Then, position error information is generated from the objective position and the current position, and dot marks can be formed while the pickup section 28 and the lens actuator 70 move following the objective positions (thick lines).

According to the feedback position control using the pickup position sensor, the traces of the laser light irradiated from the pickup are centrifugal, so that images are all time rendered. Consequently, wait time for the pickup movement is eliminated, and the time for image rendition onto the label surface of the optical disc can be reduced.

The present invention is not limited to the embodiments as have been shown and described above and in the drawings, but may be embodied with components modified and altered in various ways in a practicing stage without departing from the spirit and scope of the invention. Further, the plurality of components disclosed in the embodiment may be appropriately combined, thereby to enable configuring various other forms of the invention. For example, some components may be eliminated from all the components disclosed and shown in the embodiments. Further, the components used in the embodiments different from one another may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An optical disc device comprising:
a spindle motor configured to rotate an optical disc comprising a variable area including reflectance or transmittance cyclically varying;
an optical pickup configured to irradiate laser light onto the optical disc, and to receive reflected light from the optical disc, and to move in the radial direction of the optical disc by a lens actuator;
a feed motor configured to move the optical pickup in the radial direction;
an encoder board provided along the movement direction of the pickup and including transmittance or reflectance cyclically varying;
a pickup position sensor comprising a first emission section configured to move following the movement of the optical pickup and to concurrently irradiate light onto the encoder board, and a first light receiver configured to receive reflected light or transmitted light of light irradiated onto the encoder board;
a pickup position detection section configured to detect a position of the optical pickup in accordance with an output signal from the first light receiver of the pickup position sensor;
a rotation encoder comprising a second light emission section configured to irradiate light onto the variable area of the optical disc, and a second light receiver configured to receive a reflected light or a transmitted light of the light irradiated onto the variable area;
a 1/m rotation detector configured to count the signal outputted from the rotation encoder, and to output 1/m rotation information indicating 1/m rotation of the opti- cal disc each time a predetermined number of the signals counted wherein m is an integer greater than or equal to 2;

a control section configured to vary an objective position of the pickup in units of the 1/m track each time the 1/m rotation information is outputted from the 1/m rotation detector for forming dot marks on the label surface of the optical disc in spiral, and to control the movement of the pickup by driving the feed motor and/or the lens actuator according to position error information in correspondence to the objective position and the position of the pickup detected by the pickup position detection section, and a rotation control section configured to control the rotation of the optical disc in accordance with the signal outputted from the second light receiver of the rotation encoder so that a linear velocity of the optical disc is made constant.

2. A method of controlling an optical disc device, wherein the optical disc device comprises:

a spindle motor configured to rotate an optical disc comprising a variable area including reflectance or transmittance cyclically varying;

an optical pickup configured to irradiate laser light onto the optical disc, and to receive reflected light from the optical disc, and to move in the radial direction of the optical disc by a lens actuator;

an encoder board provided along the movement direction of the pickup and including transmittance or reflectance cyclically varying;

a pickup position sensor comprising a first emission section configured to move following the movement of the optical pickup and to concurrently irradiate light onto the encoder board, and a first light receiver configured to receive reflected light or transmitted light of light irradiated onto the encoder board; and a rotation encoder comprising a second light emission section configured to irradiate light onto the variable area of the optical disc, and a second light receiver configured to receive a reflected light or a transmitted light of the light irradiated onto the variable area, the method for forming dot marks on a label surface of an optical disc in spiral by irradiating laser light from the pickup onto the optical disc, comprises:

controlling a rotation of the optical disc to perform constant in linear velocity in accordance with an output signal of the rotation encoder;

acquiring 1/m rotation information indicating 1/m rotation of the optical disc wherein the 1/m rotation information is output each time a predetermined number of signals output from the second light receiver of the rotation encoder are counted, where m is an integer greater than or equal to 2;

varying an objective position of the pickup in units of the 1/m track each time the 1/m rotation information is outputted; and controlling the movement of the pickup by driving the feed motor and/or the lens actuator according to position error information in correspondence to the objective position and the position of the pickup detected by the pickup position detection section.

* * * * *